(12) United States Patent
Pope et al.

(10) Patent No.: US 11,796,436 B2
(45) Date of Patent: Oct. 24, 2023

(54) METHODS AND APPARATUS TO PERFORM MECHANICAL PROPERTY TESTING

(71) Applicant: Illinois Tool Works Inc., Glenview, IL (US)

(72) Inventors: Mary Pope, Newton, MA (US); Elena Mangano, Brighton, MA (US); Jason Morse, Grafton, MA (US)

(73) Assignee: Illinois Tool Works Inc., Glenview, IL (US)

( * ) Notice: Subject to any disclaimer, the term of this patent is extended or adjusted under 35 U.S.C. 154(b) by 99 days.

(21) Appl. No.: 16/964,112

(22) PCT Filed: Jan. 31, 2018

(86) PCT No.: PCT/US2018/016186
§ 371 (c)(1),
(2) Date: Jul. 22, 2020

(87) PCT Pub. No.: WO2019/152011
PCT Pub. Date: Aug. 8, 2019

(65) Prior Publication Data
US 2021/0033510 A1 Feb. 4, 2021

(51) Int. Cl.
*G01N 3/62* (2006.01)
*G01N 3/02* (2006.01)

(52) U.S. Cl.
CPC .............. *G01N 3/62* (2013.01); *G01N 3/02* (2013.01)

(58) Field of Classification Search
CPC ............ G06F 11/3684; G06F 11/3672; G06F 11/3688; G06F 11/079; G06F 30/20; G06F 1/1643; G06F 11/3676; G06F 1/3696; G06F 30/00; G06F 11/3668; G06F 9/4401; G06F 40/18; G06F 11/3656;
(Continued)

(56) References Cited

U.S. PATENT DOCUMENTS 8,342,017 B1 1/2013 Bossi
8,825,423 B1 9/2014 Brovold
(Continued)

FOREIGN PATENT DOCUMENTS

CN 1975370 6/2007
CN 101688818 3/2010
(Continued)

OTHER PUBLICATIONS

Int'l Search Report and Written Opinion for PCT/US2018/016186 dated Jun. 19, 2018 (12 pgs.).
(Continued)

*Primary Examiner* — Brandi N Hopkins
(74) *Attorney, Agent, or Firm* — McAndrews, Held & Malloy, Ltd.

(57) ABSTRACT

Methods and apparatus to perform mechanical property testing are disclosed. An example testing device includes a computing device configured to obtain a measurement value related to the material or component under test. The computing device includes: a display device; an input device; a processor; and memory coupled to the processor to store computer readable instructions which, when executed by the processor, cause the processor to: display, via the display device, a testing mode interface either directly or in response to selection of the testing mode interface at the first interface, the testing mode interface configured to enable selection of a predetermined test definition interface; and in response to selection of the predetermined test definition interface via the input device, display a test interface, the test interface comprising: inputs for a predetermined subset of configurable test parameters of the testing device; and activation of a mechanical property test.

20 Claims, 7 Drawing Sheets

(58) Field of Classification Search
CPC .......... G06F 8/52; G06F 17/50; G06F 11/22; G06F 9/44505; G06F 17/5018; G06F 11/3428; G06F 11/263; G06F 11/3664; G01R 1/025; G01R 31/2849; G01R 31/3193; G01R 31/31912; G01R 31/2834; G01R 31/26; G01R 31/31713; G01N 35/00871; G01N 3/02; G01N 3/46; G01N 3/40; G01N 3/62; G01N 3/42; G01N 29/043; G01N 3/08; G05B 19/0423; G05B 15/02; G09G 3/006; H04M 1/24; G09B 5/00

See application file for complete search history.

(56) References Cited

U.S. PATENT DOCUMENTS

| | | |
|---|---|---|
| 9,103,758 B1 | 8/2015 | Frisch |
| 2014/0102211 A1 | 4/2014 | Schulz |

FOREIGN PATENT DOCUMENTS

| | | |
|---|---|---|
| CN | 103543073 | 1/2014 |
| CN | 103698125 | 4/2014 |
| CN | 107168832 | 9/2017 |
| CN | 107436263 | 12/2017 |
| JP | 2002250682 | 9/2002 |
| JP | 2017106814 | 6/2017 |
| WO | 2013177149 A2 | 11/2013 |

OTHER PUBLICATIONS

Starrett® PKG08807-UML1 Software for Basic Force MKeasurement User Manual, Sep. 2017 (56 pgs).
Ametek® Sensors, Test and Calibration, Part No. 01/5009, CS2-225 & CS2-1100, Force Tester User Manual, Sep. 2017 (112 pgs.).
European Examination Report Appln No. 18705527.2 dated Jul. 19, 2022.
Jiazhong Xu, et al., "Mechanical CAD/CAM", China Science and Technology Press, Aug. 31, 2008, pp. 187-192.

METHODS AND APPARATUS TO PERFORM MECHANICAL PROPERTY TESTING

BACKGROUND

This disclosure relates generally to mechanical testing, and more particularly, to methods and apparatus to perform mechanical property testing.

Universal testing machines are used to perform mechanical testing, such as compression strength testing or tension strength testing, on materials or components.

SUMMARY

Methods and apparatus to perform mechanical property testing are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

The figures are not necessarily to scale. Wherever appropriate, similar or identical reference numerals are used to refer to similar or identical components.

DETAILED DESCRIPTION

Figure 1:
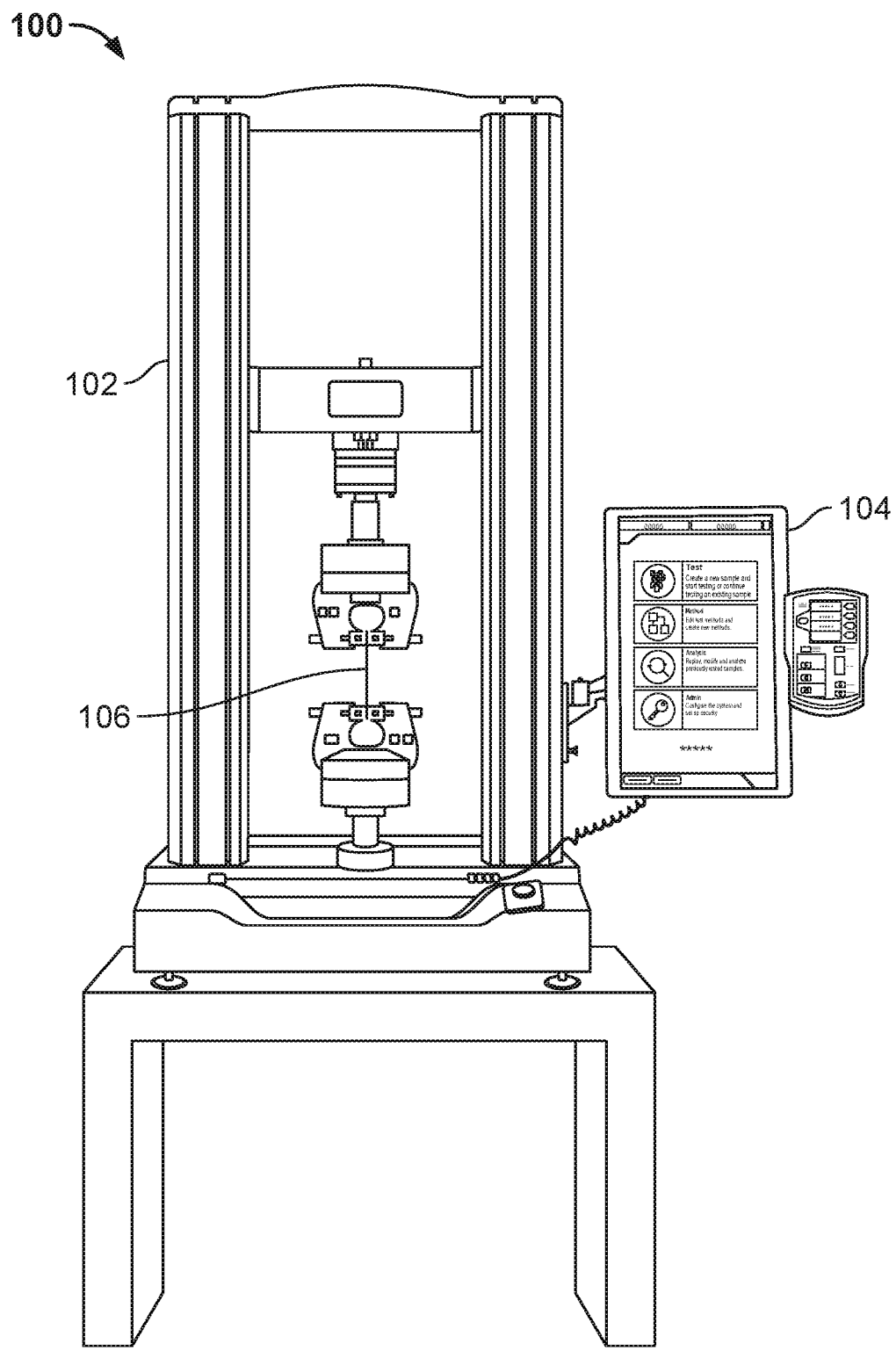
FIG. 1 is an example testing device to perform mechanical property testing, in accordance with aspects of this disclosure.

Disclosed example testing devices improve the utility and ease of use of universal testing machines by improving the speed at which test operators are capable of performing mechanical testing. Conventional universal testing machines require the operator to explicitly set up a set of several test parameters to accomplish even tests having few relevant parameters. In contrast with conventional testing machines, disclosed example testing devices include at least one predetermined test definition interface, or "QuickTest" mode, that enables an operator to quickly input values for a small subset of the configurable parameters of the universal testing machine, such as the parameters that are most often used or are the most relevant to define a variety of tests. In some examples, the configurable parameters of the QuickTest mode for a universal testing machine include test direction, test rate, and units of rate.

While conventional universal testing machines enable users to save predefined sets of parameters, such as a method that is preset to a specific material test, disclosed example testing devices may have the predetermined test definition interface as preconfigured user interface within the software or firmware of the testing device. Disclosed testing devices can significantly improve the speed and simplicity of universal testing for operators, thereby improving testing speed, user experience, and/or operator efficiency.

Disclosed example testing devices measure a mechanical property of a material or component under test, and include a computing device to obtain a measurement value related to the material or component under test. The computing device includes a display device, an input device, a processor, and a memory coupled to the processor to store computer readable instructions. The instructions, when executed by the processor, cause the processor to: display, via the display device, a testing mode interface configured to enable selection of a predetermined test definition interface; and in response to selection of the predetermined test definition interface via the input device, display a test interface. The test interface includes inputs for a predetermined subset of configurable test parameters of the testing device.

In some example testing devices, the predetermined subset are limited in number to fit on the display device without a need to open additional dialogs. In some examples, the inputs for the predetermined ones of the configurable test parameters include a selection of the mechanical properties to be tested by the mechanical property test. In some such examples, the selection of the mechanical property comprises a selection of at least one of a compression strength, a tensile strength, a torsion strength.

In some example testing devices, the inputs for the predetermined subset of the configurable test parameters include a test rate. In some such examples, the inputs for the predetermined subset of the configurable test parameters including a rate selection. The rate selection includes at least one of a displacement rate, a rotation rate, a force rate, or a strain rate.

In some examples, the computer readable instructions cause the processor to store input values for the predetermined subset of the configurable test parameters, and populate the input values for the predetermined subset of the configurable test parameters in response to a subsequent display of the predetermined test definition interface. In some such examples, the computer readable instructions cause the processor to store input values for auxiliary information associated with the mechanical property test, and populate the input values for the auxiliary information in response to the subsequent display of the predetermined test definition interface.

In some examples, the computer readable instructions cause the processor to display the testing mode interface in response to selection of the testing mode interface in an operation mode selection interface. In some such examples, the operation mode selection interface further includes a selection for defining a test method to be performed by the testing device.

In some example testing systems, the test interface includes a display of real-time test measurements of the mechanical property test. In some examples, the predetermined subset are displayed on the display device without requiring opening a dialog in the test interface. In some examples, the test interface includes a graphical display of at least one of test measurements or test results of the mechanical property test. In some such examples, the test interface updates the graphical display of the test measurements in response to the processor receiving the test measurements.

In some example testing devices the configurable test parameters that are included in the predetermined subset are not configurable. In some examples, the test interface further includes an input to activate a mechanical property test.

Disclosed example testing devices measure a mechanical property of a material or component under test, and include a computing device to obtain a measurement value related to the material or component under test. The computing device includes a display device, an input device, a processor, and a memory coupled to the processor to store computer readable instructions. When executed by the processor, the instructions cause the processor to, in response to an initialization event at the computing device, display a test interface comprising inputs for a predetermined subset of configurable test parameters of the testing device.

In some examples, the initialization event include a user login at the computing device. In some examples, the initialization event comprises a startup of the testing device or the computing device.

In some example testing devices, the predetermined subset are limited in number to fit on the display device without a need to open additional dialogs. In some examples, the inputs for the predetermined ones of the configurable test parameters include a selection of the mechanical properties to be tested by the mechanical property test. In some such examples, the selection of the mechanical property comprises a selection of at least one of a compression strength, a tensile strength, a torsion strength.

In some example testing devices, the inputs for the predetermined subset of the configurable test parameters include a test rate. In some such examples, the inputs for the predetermined subset of the configurable test parameters including a rate selection. The rate selection includes at least one of a displacement rate, a rotation rate, a force rate, or a strain rate.

In some examples, the computer readable instructions cause the processor to store input values for the predetermined subset of the configurable test parameters, and populate the input values for the predetermined subset of the configurable test parameters in response to a subsequent display of the predetermined test definition interface. In some such examples, the computer readable instructions cause the processor to store input values for auxiliary information associated with the mechanical property test, and populate the input values for the auxiliary information in response to the subsequent display of the predetermined test definition interface.

In some examples, the computer readable instructions cause the processor to display the testing mode interface in response to selection of the testing mode interface in an operation mode selection interface. In some such examples, the operation mode selection interface further includes a selection for defining a test method to be performed by the testing device.

In some example testing systems, the test interface includes a display of real-time test measurements of the mechanical property test. In some examples, the predetermined subset are displayed on the display device without requiring opening a dialog in the test interface. In some examples, the test interface includes a graphical display of at least one of test measurements or test results of the mechanical property test. In some such examples, the test interface updates the graphical display of the test measurements in response to the processor receiving the test measurements.

In some example testing devices the configurable test parameters that are included in the predetermined subset are not configurable. In some examples, the test interface further includes an input to activate a mechanical property test.

FIG. 1 is an example testing device 100 to perform mechanical property testing. The example testing device 100 may be, for example, a universal testing system capable of static mechanical testing. The testing device 100 may perform, for example, compression strength testing, tension strength testing, shear strength testing, bend strength testing, deflection strength testing, tearing strength testing, peel strength testing (e.g., strength of an adhesive bond), torsional strength testing, and/or any other compressive and/or tensile testing. Additionally or alternatively, the testing device 100 may perform dynamic testing.

The example testing device 100 includes a test fixture 102 and a computing device 104 communicatively coupled to the test fixture 102. The test fixture 102 applies loads to a material under test 106 and measures the mechanical properties of the test, such as displacement of the material under test 106 and/or force applied to the material under test 106.

The example computing device 104 may be used to configure the test fixture 102, control the test fixture 102, and/or receive measurement data (e.g., transducer measurements such as force and displacement) and/or test results (e.g., peak force, break displacement, etc.) from the test fixture 102 for processing, display, reporting, and/or any other desired purposes.

Figure 2:
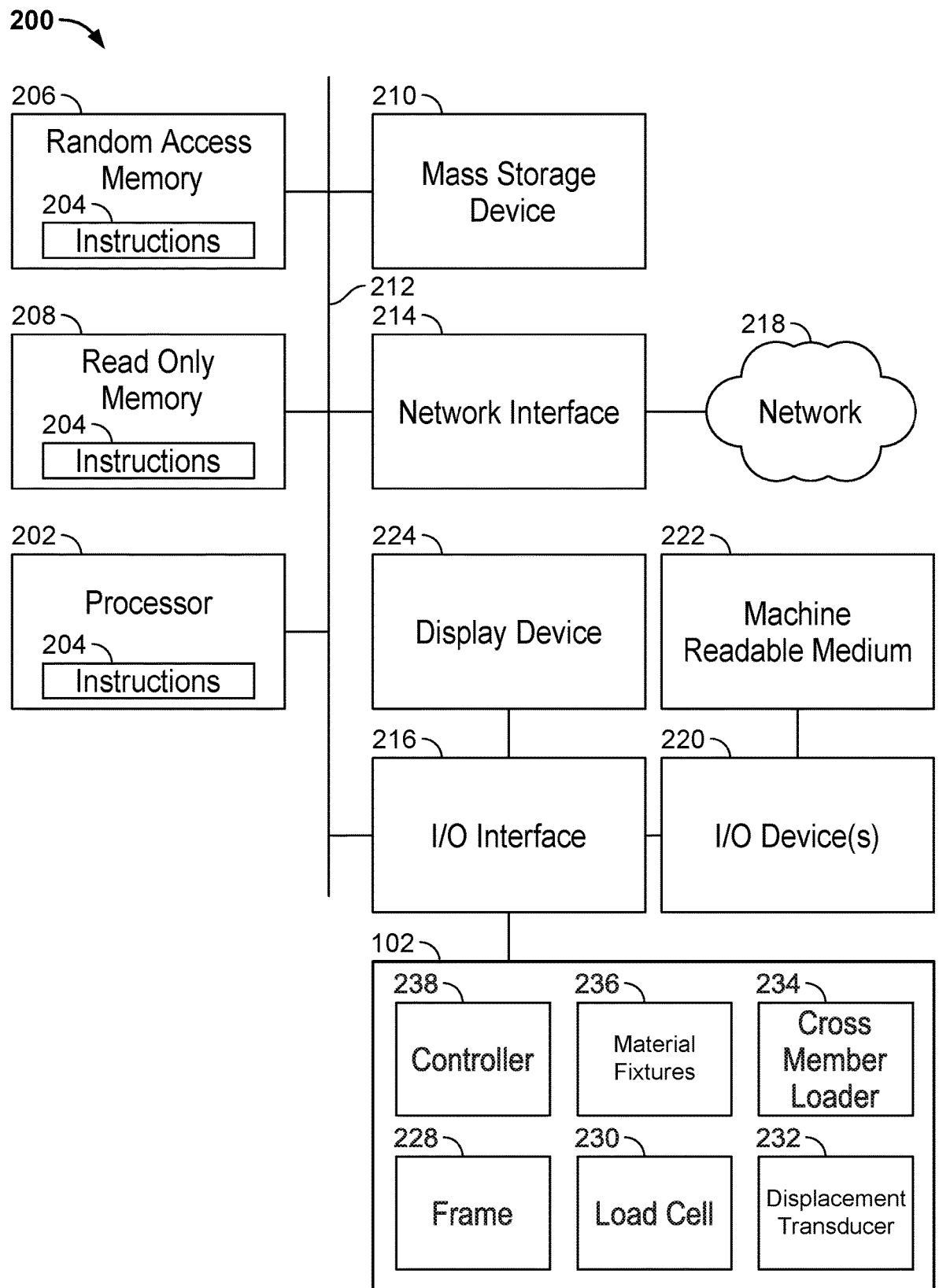
FIG. 2 is a block diagram of an example implementation of the testing device of FIG. 1.

FIG. 2 is a block diagram of an example implementation of the testing device 100 of FIG. 1. The example testing device 100 of FIG. 2 includes the test fixture 102 and the computing device 104. The example computing device 104 may be a general-purpose computer, a laptop computer, a tablet computer, a mobile device, a server, an all-in-one computer, and/or any other type of computing device.

The example computing device 200 of FIG. 2 includes a processor 202. The example processor 202 may be any general purpose central processing unit (CPU) from any manufacturer. In some other examples, the processor 202 may include one or more specialized processing units, such as RISC processors with an ARM core, graphic processing units, digital signal processors, and/or system-on-chips (SoC). The processor 202 executes machine readable instructions 204 that may be stored locally at the processor (e.g., in an included cache or SoC), in a random access memory 206 (or other volatile memory), in a read only memory 208 (or other non-volatile memory such as FLASH memory), and/or in a mass storage device 210. The example mass storage device 210 may be a hard drive, a solid state storage drive, a hybrid drive, a RAID array, and/or any other mass data storage device.

A bus 212 enables communications between the processor 202, the RAM 206, the ROM 208, the mass storage device 210, a network interface 214, and/or an input/output interface 216.

The example network interface 214 includes hardware, firmware, and/or software to connect the computing device 201 to a communications network 218 such as the Internet. For example, the network interface 214 may include IEEE 202.X-compliant wireless and/or wired communications hardware for transmitting and/or receiving communications.

The example I/O interface 216 of FIG. 2 includes hardware, firmware, and/or software to connect one or more input/output devices 220 to the processor 202 for providing input to the processor 202 and/or providing output from the processor 202. For example, the I/O interface 216 may include a graphics processing unit for interfacing with a display device, a universal serial bus port for interfacing with one or more USB-compliant devices, a FireWire, a field bus, and/or any other type of interface. The example testing device 100 includes a display device 224 (e.g., an LCD screen) coupled to the I/O interface 216. Other example I/O device(s) 220 may include a keyboard, a keypad, a mouse, a trackball, a pointing device, a microphone, an audio speaker, a display device, an optical media drive, a multi-touch touch screen, a gesture recognition interface, a magnetic media drive, and/or any other type of input and/or output device.

The example computing device 200 may access a non-transitory machine readable medium 222 via the I/O interface 216 and/or the I/O device(s) 220. Examples of the machine readable medium 222 of FIG. 2 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

The example testing device 100 of FIG. 1 further includes the test fixture 102 coupled to the computing device 200. In the example of FIG. 2, the test fixture 102 is coupled to the computing device via the I/O interface 216, such as via a USB port, a Thunderbolt port, a FireWire (IEEE 1394) port, and/or any other type serial or parallel data port. In some other examples, the test fixture 102 is coupled to the network interface 214 via a wired or wireless connection (e.g., Ethernet, Wi-Fi, etc.), either directly or via the network 218.

The test fixture 102 of FIG. 2 includes a frame 228, a load cell 230, a displacement transducer 232, a cross member loader 234, material fixtures 236, and a controller 238. The frame 228 provides rigid structural support for the other components of the test fixture 102 that perform the test. The load cell 230 measures force applied to a material under test by the cross-member loader 234 via the grips 236. The cross-member loader 234 applies force to the material under test, while the material fixtures 236 grasp or otherwise couple the material under test to the cross-member loader 234. Example grips 236 include compression platens, jaws or other types of fixtures, depending on the mechanical property being tested and/or the material under test.

The example controller 238 communicates with the computing device 200 to, for example, receive test parameters from the computing device 200 and/or report measurements and/or other results to the computing device 200. For example, the controller 238 may include one or more communication or I/O interfaces to enable communication with the computing device 104. The controller 238 may control the cross-member loader 234 to increase or decrease applied force, control the fixture(s) 236 to grasp or release a material under test, and/or receive measurements from the displacement transducer 232, the load cell 230 and/or other transducers.

FIGS. 3-6 illustrate example user interfaces (e.g., interactive display screens) that may be implemented by the computing device 104 of FIGS. 1 and 2 to enable an operator of the testing device 100 to perform a "QuickTest." An example QuickTest is a test method having a predetermined subset of all of the configurable test parameters of the testing device 100. In the example disclosed with reference to FIGS. 3-6, the predetermined subset of configurable test parameters includes test parameters that are commonly used (e.g., most commonly used), and/or include test parameters that are most often defined by the operator when creating new test methods. The example user interfaces of FIGS. 3-6 discussed below enable rapid selection and performance of the QuickTest method, and is distinguished from stored, operator-defined test methods in that the QuickTest significantly limits the number of configurable test parameters (e.g., by populating the remaining parameters) and/or is predefined within the software or firmware of the computing device 104.

Figure 3:
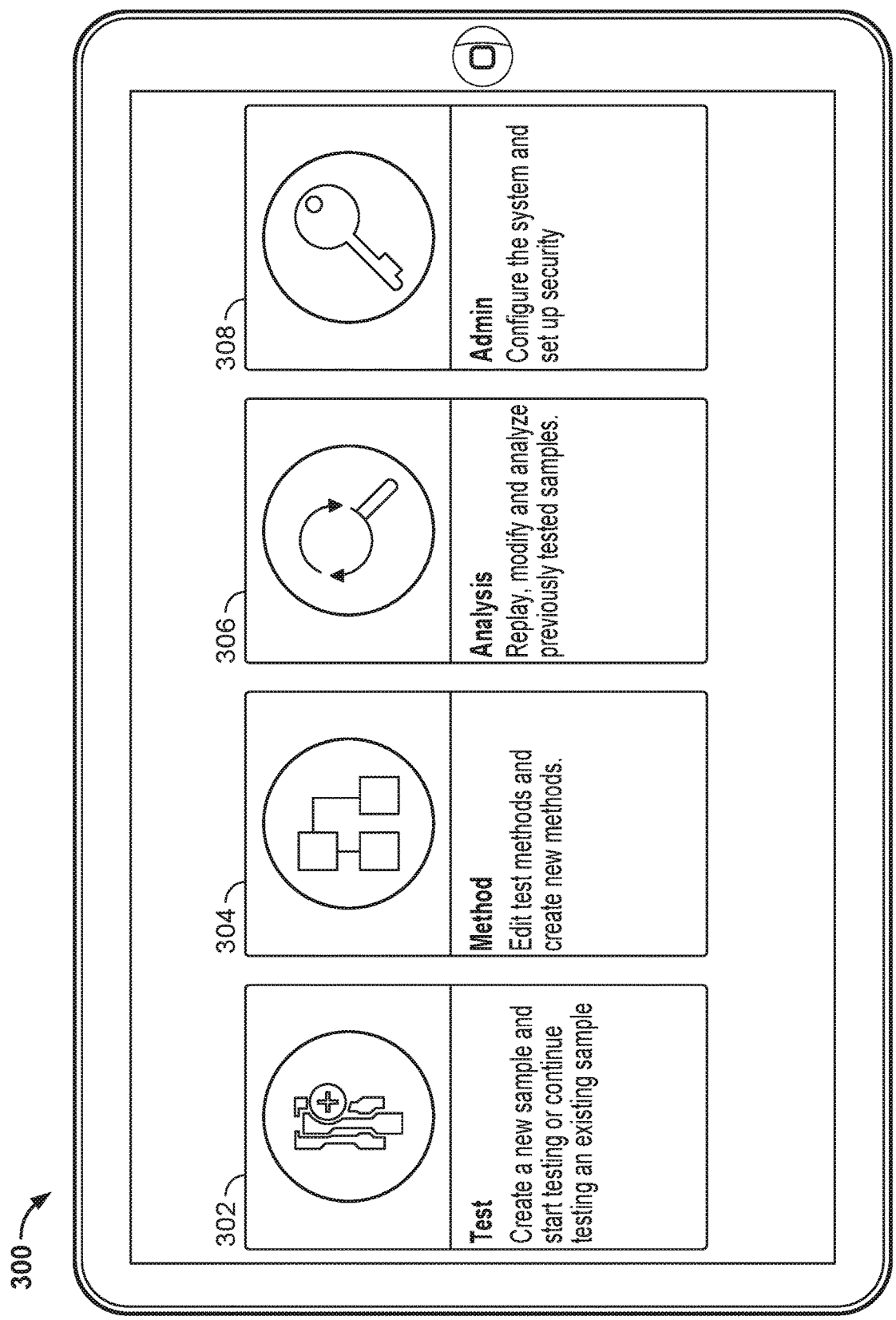
FIG. 3 is an example user interface showing a number of user selectable tasks which may be displayed by the example testing device of FIG. 1.

FIG. 3 is an example user interface 300 showing a number of user selectable tasks 302, 304, 306, 308 of the testing device 100 of FIG. 1, and which may be displayed by the example testing device 100 (e.g., via the display device 224 of FIG. 1). The example user selectable tasks 302-308 may be selected using an input device, such as a touchscreen or cursor. Selection of the user selectable task 302 cause the computing device 104 to display a testing mode interface, such as the testing mode interface illustrated in FIG. 4.

Other example user selectable tasks illustrated in FIG. 3 include a method definition mode 304 (e.g., a mode in which an operator can define test methods using any of the configurable test parameters available to the testing device 100), an analysis mode 306 (e.g., a mode in which results of prior tests may be reviewed and/or analyzed), and/or a configuration mode 308 (e.g., a mode in which aspects of the testing device 100 can be configured).

Figure 4:
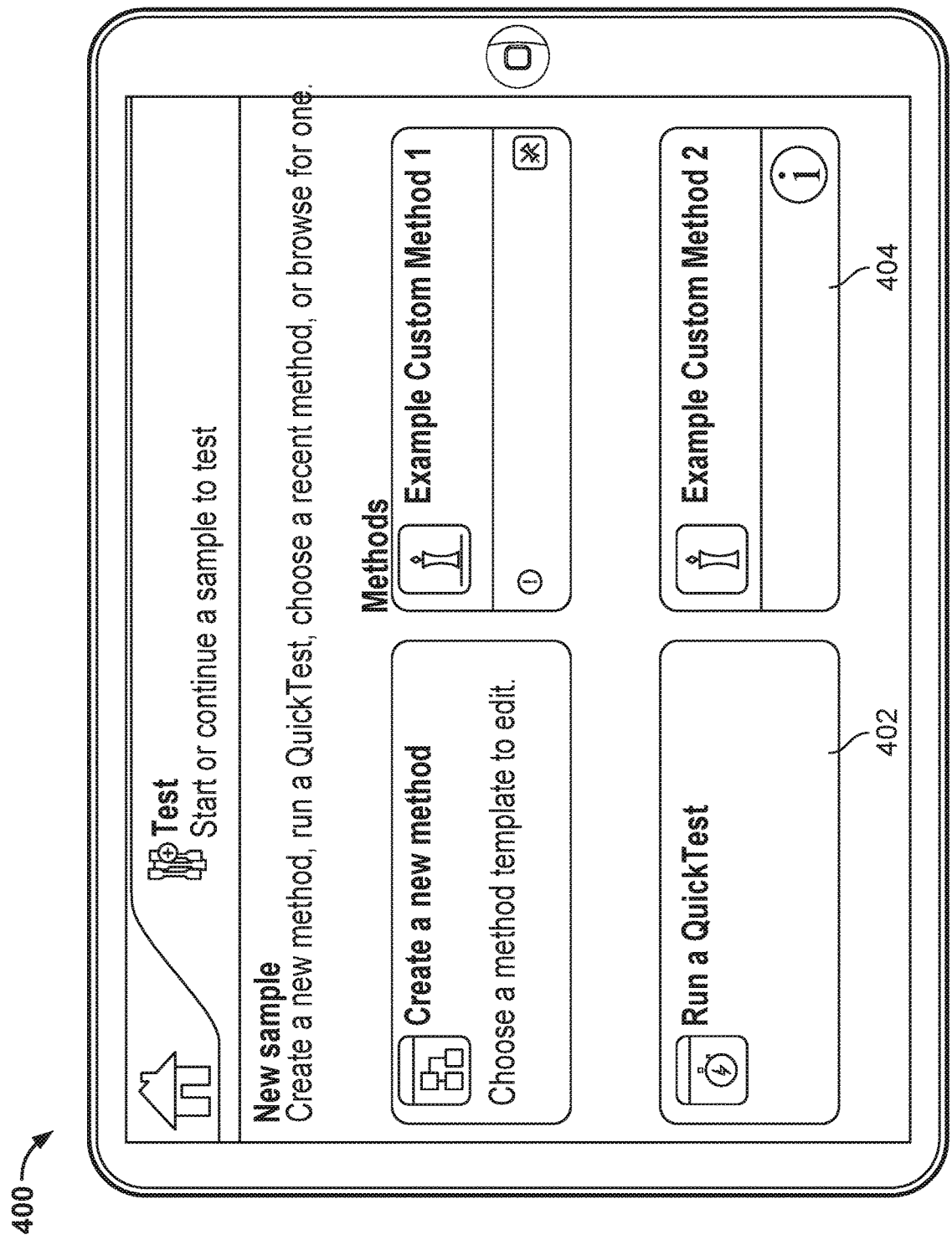
FIG. 4 is another example user interface showing a number of test definition selections of the testing device and which may be displayed by the example testing device of FIG. 1.
Figure 5:
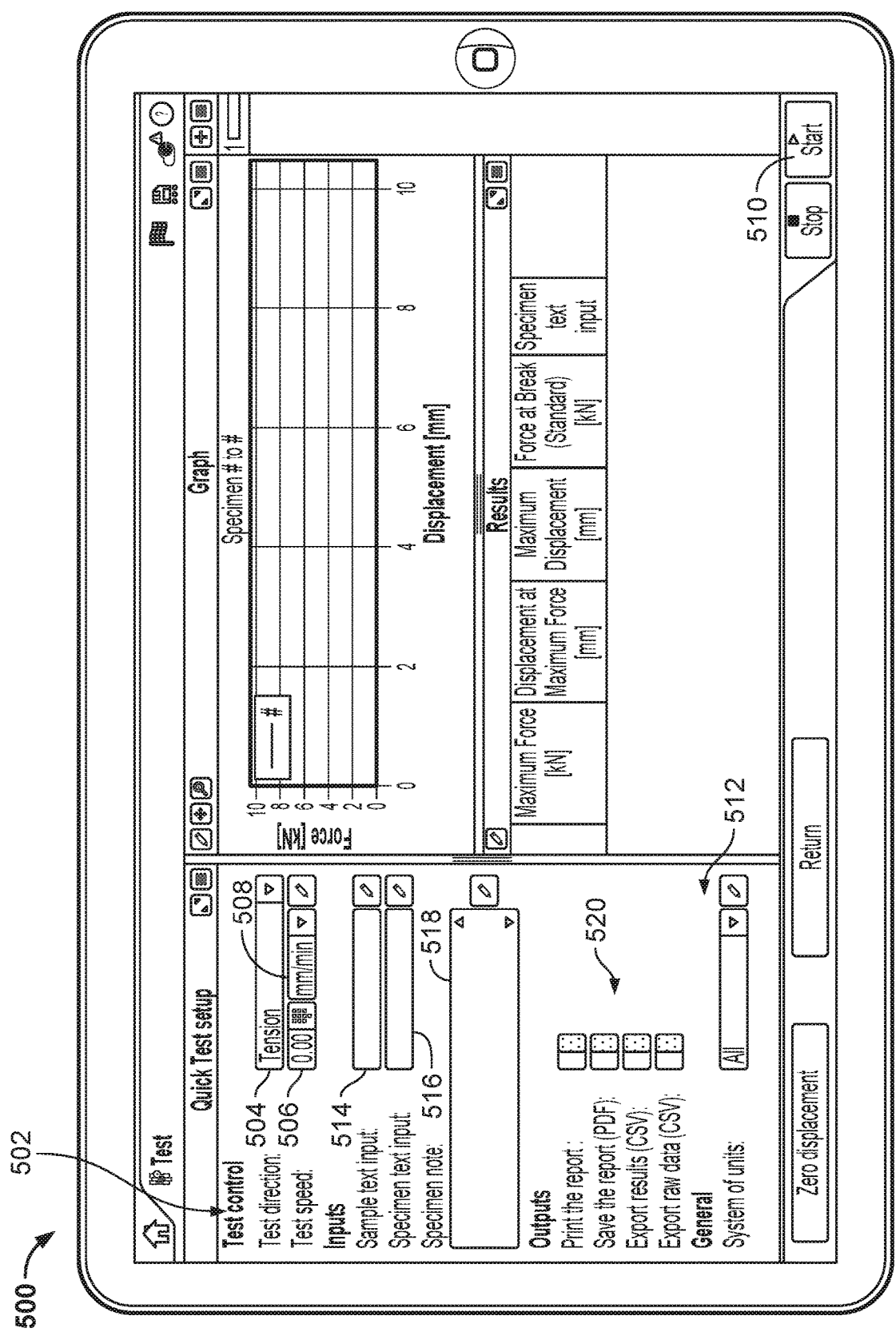
FIG. 5 is another example user interface showing a test interface and which may be displayed by the example testing device of FIG. 1 in response to selection of a "QuickTest" predetermined test definition.

FIG. 4 is another example user interface 400 showing a number of test definition selections 402, 404 of the testing device 100, and which may be displayed by the example testing device of FIG. 1. The example test definition selection 402 enables an operator to select a predetermined test definition interface, an example of which is illustrated in FIG. 5. The test definition selection 402 corresponds to the "QuickTest" mode including the predetermined subset of configurable test parameters.

Other example test definition selections include an operator-defined test method 404, which has been previously configured by an operator (or administrator) and saved to the testing device 100.

FIG. 5 is another example user interface 500 showing a test setup interface 502 and which may be displayed by the example testing device 100 of FIG. 1 in response to selection of a "QuickTest" predetermined test definition 402 of FIG. 4.

The example test setup interface 502 includes a limited, predetermined set of configurable test parameters. The limited, predetermined set of configurable test parameters may be selected such that the user interface 500 is flat (e.g., that the set of configurable test parameters fits on a single interface and/or that no additional windows, dialogs or other interfaces are required to access the set of configurable test parameters. In the example interface 500, the set of configurable test parameters only includes a test direction 504, a test rate 506, and units of test rate 508. The test direction 504 may define a mechanical property being tested, such as tension or compression. In some examples, the "tension" and "compression" directions define the two directions in which a single-dimension test device is capable of exerting force, and other mechanical properties such as shear strength testing, bend strength testing, deflection strength testing, tearing strength testing, and/or peel strength testing can be performed by configuring the test direction 504 to "tension," "compression," "clockwise rotation," and/or "counter-clockwise rotation," and appropriately orienting the material under test and/or using fixtures appropriate for the type of test.

The example test rate 506 defines a rate at which the testing device 100 changes displacement and/or force in the material under test. The units of test rate 508 define how the rate input to the test rate 506 is interpreted by the controller 238. Example units may include units of displacement (e.g., distance per unit time, such as millimeters per minute (mm/min)) and/or units of force (e.g., force per unit time, such as kilonewtons per minute (kN/min)), in imperial units and/or metric units. Additionally or alternatively, the units of test rate 508 may be defined in terms of a transducer measurement, in which the test rate is controlled at least in part based on feedback from the transducer. An example of a transducer-based test rate 508 may include extension of the material under test, as measured by an extensometer or other transducer of material extension. The test rate 508 may enable selection between one or more of a displacement rate, a rotation rate, a force rate, or a strain rate.

The example user interface 500 further includes a test activation button 510 (e.g., a Start button) that commands the controller 238 to initiate or activate the mechanical property test using the parameters input in the configurable test parameters 504-508. Additionally or alternatively, a physical button located on the test fixture 102 may be used to initiate or activate the mechanical property test in the same manner as the test activation button 510.

The example user interface 500 of FIG. 5 may further include additional input configuration parameters 514-518 and an output configuration interface 512. The input configuration parameters 514-518 are auxiliary information that do not affect the mechanical property test, but may provide information to be associated with the resulting output. Example output parameters that may be defined include a sample text input 514, a specimen text input 516, and a specimen note 518. The output configuration interface 512 is auxiliary information that may include output format selections 520 to specify ways of transferring and/or recording the results outside of the testing device 100. The output format selections may specify file formats for the results, storage and/or transmission locations for the results, components to be used to transmit, store, or otherwise output the results (e.g., the I/O interface 216, the network interface 214, the display device 224, the mass storage device 210) and/or any other output configuration options.

In some examples, the test setup interface 502 stores the most recently used inputs to the configurable test parameters 504-508, the additional input configuration parameters 514-518, and/or the output configuration interface 520, when the user interface 500 is closed, such as when an operator selects to return to one of the interfaces 300, 400 of FIGS. 3 and/or 4. When the operator returns to the test setup interface 502 at a later time, the parameters may then be recalled and populated into the configurable test parameters 504-508, the additional input configuration parameters 514-518, and/or the output configuration interface 520 to potentially further increase the speed at which a test can be activated on the testing device 100.

Figure 6:
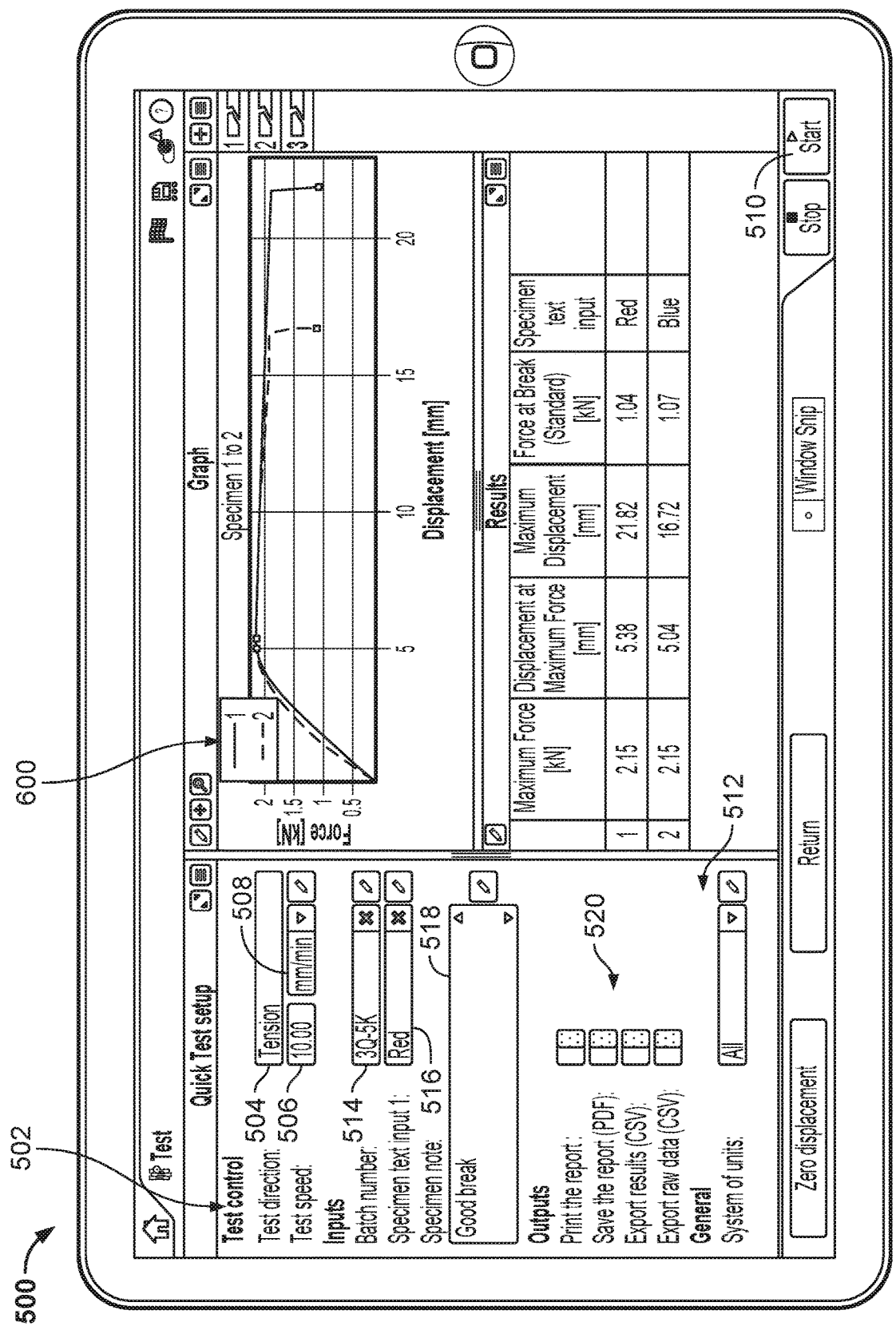
FIG. 6 is another example user interface showing the test interface of FIG. 5 and including graphically displayed data and test results from a mechanical property test.

FIG. 6 is another example user interface showing the test interface 500 of FIG. 5 and including test results 600 from a mechanical property test. The example test results 600 include a results graph 602 and a results table 604. The example test results 600 may include results for one or more test specimens in a single interface.

Figure 7:
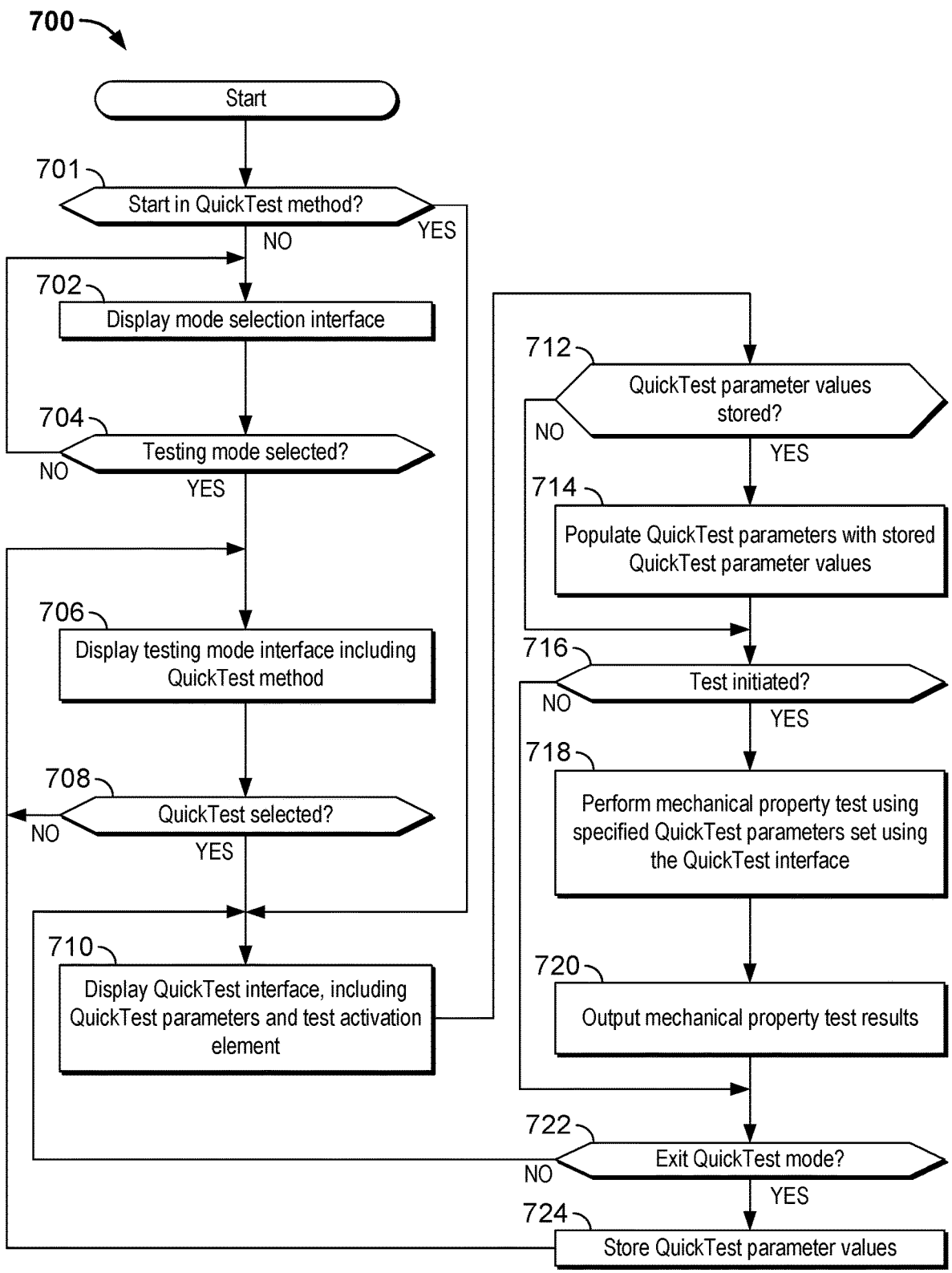
FIG. 7 is a flowchart representative of example machine readable instructions which may be executed to implement the testing device of FIGS. 1 and/or 2.

FIG. 7 is a flowchart representative of example machine readable instructions 700 which may be executed to implement the testing device 100 of FIGS. 1 and/or 2. The example machine readable instructions 700 may be performed by the testing device 100 (e.g., via the computing device 104) to perform mechanical property testing. In some examples, the instructions 700 begin when an operator logs into the testing device 100. Additionally or alternatively, the instructions 700 begin when the testing device 100 is turned on and/or initialized.

At block 701, the testing device 100 (e.g., via the processor 202) determines whether to start in a predetermined test definition interface (e.g., a Quick-Test mode). For example, the testing device 100 may be configured to enter the Quick-Test mode immediately upon operator login or other initialization event.

If the testing device 100 is not configured to start in Quick-Test mode (block 701), at block 702, the testing device 100 displays a mode selection interface (e.g., the user interface 300 of FIG. 3, via the display device 224). The mode selection interface may include a number of user selectable tasks for selection, including a testing mode such as the user selectable task 302 of FIG. 3. At block 704, the processor 202 determines whether the testing mode has been selected (e.g., via the I/O device(s) 220). If the testing mode has not been selected (block 704), control returns to block 702 to continue displaying the mode selection interface. In other examples in which a different operation mode is selected (e.g., one of the user selectable tasks 304-308), the example processor 202 may implement the selected user selectable task and the instructions 700 may end and/or return control to block 702 to display the mode selection interface 300.

If the testing mode has been selected (block 704), at block 706 the testing device 100 displays (e.g., via the display device 224) a testing mode interface including a QuickTest method. For example, the processor 202 may cause the display device 224 to display the example user interface 400 of FIG. 4 including the test definition selection 402. At block 708, the processor 202 determines whether the test definition selection 402 (e.g., a QuickTest definition) has been selected. If the test definition selection 402 has not been selected (block 708), control returns to block 706 to continue displaying the testing mode interface 400. In other examples in which a different test definition is selected (e.g., the test definition selection 404), the example processor 202 may implement the selected test definition and the instructions 700 may end and/or return control to block 702 to display the mode selection interface 300.

If the test definition selection 402 has been selected (block 708), or if the testing device 100 is configured to start in Quick-Test mode (block 701), at block 710 the example testing device 100 displays (e.g., via the display device 224) a predetermined test definition interface including a predetermined subset of the configurable test parameters and a test activation element. For example, the testing device 100 may display the test setup interface 502 of FIG. 5, including the configurable test parameters 504-508 of the testing device 100 and the test activation button 510. The testing device 100 may further display the additional input configuration parameters 514-518 and/or the output configuration interface 520 when the test definition is selected.

At block 712, the processor 202 determines whether values for the configurable test parameters 504-508, the additional input configuration parameters 514-518, and/or the output configuration interface 520 have been previously stored. For example, the most recently used parameter values may be stored in memory and/or a nonvolatile storage device. If values for the configurable test parameters 504-508, the additional input configuration parameters 514-518, and/or the output configuration interface 520 have been previously stored (block 712), the example processor 202 populates the values for the configurable test parameters 504-508, the additional input configuration parameters 514-518, and/or the output configuration interface 520 into the test setup interface 502. The populated values may be changed by an operator of the testing device 100.

After populating the values for the configurable test parameters (block 714), or if values for the configurable test parameters have not been previously stored (block 712), at block 716 the processor 202 determines whether a test has been activated (e.g., via selection the test activation button 510). If a test has been activated (block 716), at block 718 the testing device 100 performs a mechanical property test using specified parameters set using the test setup interface 502. At block 720, the testing device 100 outputs mechanical property test results (e.g., to the interface 500). In some examples, the testing device 100 automatically stores the test results to a storage device using default, predetermined, and/or custom file storage settings. In some other examples, the testing device 100 displays the test results (e.g., via the results graph 602 and/or the table 604, and does not store the test results until a command to store is received (e.g., from an operator).

After outputting the mechanical property test results (block 720), or if a test has not been activated (block 716), at block 722 the processor determines whether to exit the predetermined test definition interface. For example, an operator may select an option to return to the testing mode interface and/or to the task interface. The option to return to the testing mode interface and/or to the task selection interface may be provided at the conclusion of a test and/or may be continually displayed on the predetermined test definition interface (e.g., in a menu area). If the predetermined test definition interface is not to be exited (block 722), control returns to block 710.

In response to exiting the predetermined test definition interface (block 722), at block 724 the processor stores values for the configurable test parameters that were populated in the configurable test parameters 504-508, the additional input configuration parameters 514-518, and/or the output configuration interface 520 when the test definition is selected (e.g., previously populated, populated by the operator, etc.). Control then returns to block 706 to display the testing mode interface.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

The invention claimed is:

1. A testing device to measure a mechanical property of a material or component under test, the testing device comprising:
    a computing device configured to obtain a measurement value related to the material or component under test, the computing device comprising:
        a display device;
        an input device;
        a processor; and
        a memory coupled to the processor to store computer readable instructions which, when executed by the processor, cause the processor to:
            display, via the display device, a testing mode interface configured to enable selection of a predetermined test definition interface; and
            in response to selection of the predetermined test definition interface via the input device, display a test interface, the test interface comprising inputs for a predetermined subset of configurable test parameters of the testing device.

2. The testing device as defined in claim 1, wherein the predetermined subset are limited in number to fit on the display device without a need to open additional dialogs.

3. The testing device as defined in claim 1, wherein the inputs for the predetermined ones of the configurable test parameters comprise a selection of the mechanical properties to be tested by the mechanical property test.

4. The testing device as defined in claim 3, wherein the selection of the mechanical property comprises a selection of at least one of a compression strength, a tensile strength, a torsion strength.

5. The testing device as defined in claim 1, wherein the inputs for the predetermined subset of the configurable test parameters comprise a test rate.

6. The testing device as defined in claim 5, wherein the inputs for the predetermined subset of the configurable test parameters comprise a rate selection including at least one of a displacement rate, a rotation rate, a force rate, or a strain rate.

7. The testing device as defined in claim 1, wherein the computer readable instructions further cause the processor to:
store input values for the predetermined subset of the configurable test parameters; and
populate the input values for the predetermined subset of the configurable test parameters in response to a subsequent display of the predetermined test definition interface.

8. The testing device as defined in claim 7, wherein the computer readable instructions further cause the processor to:
store input values for auxiliary information associated with the mechanical property test; and
populate the input values for the auxiliary information in response to the subsequent display of the predetermined test definition interface.

9. The testing device as defined in claim 1, wherein the computer readable instructions cause the processor to display the testing mode interface in response to selection of the testing mode interface in an operation mode selection interface.

10. The testing device as defined in claim 9, wherein the operation mode selection interface further comprises a selection for defining a test method to be performed by the testing device.

11. The testing device as defined in claim 1, wherein the test interface further comprises a display of real-time test measurements of the mechanical property test.

12. The testing device as defined in claim 1, wherein the predetermined subset are configured to be displayed on the display device without requiring opening a dialog in the test interface.

13. The testing device as defined in claim 1, wherein the test interface further comprises a graphical display of at least one of test measurements or test results of the mechanical property test.

14. The testing device as defined in claim 13, wherein the test interface is configured to update the graphical display of the test measurements in response to the processor receiving the test measurements.

15. The testing device as defined in claim 1, wherein the ones of the configurable test parameters that are included in the predetermined subset are not configurable.

16. The testing device as defined in claim 1, wherein the test interface further comprises an input to activate a mechanical property test.

17. A testing device to measure a mechanical property of a material or component under test, the testing device comprising:
a computing device configured to obtain a measurement value related to the material or component under test, the computing device comprising:
a display device;
an input device;
a processor; and
a memory coupled to the processor to store computer readable instructions which, when executed by the processor, cause the processor to, in response to an initialization event at the computing device, display a test interface comprising inputs for a predetermined subset of configurable test parameters of the testing device.

18. The testing device as defined in claim 17, wherein the initialization event comprises a user login at the computing device.

19. The testing device as defined in claim 17, wherein the initialization event comprises a startup of the testing device or the computing device.

20. The testing device as defined in claim 17, wherein the predetermined subset are limited in number to fit on the display device without need to open additional dialogs.

* * * * *